United States Patent

Long et al.

[15] 3,681,533

[45] Aug. 1, 1972

[54] SWITCHING STRATEGY FOR MIXED DELAY TRANSMISSION CHANNELS

[72] Inventors: Norwood G. Long, New Shrewsbury; Carl J. May, Jr., Holmdel, both of N.J.

[73] Assignee: Bell Telephone Laboratories Incorporated, Murray Hill, N.J.

[22] Filed: July 24, 1969

[21] Appl. No.: 844,379

[52] U.S. Cl. ....................179/15 AS
[51] Int. Cl. ....................H04j 5/00
[58] Field of Search ..........170/15 AS, 15 BA

[56] References Cited

UNITED STATES PATENTS 3,406,257 10/1968 Long ....................179/15 AS

*Primary Examiner*—Ralph D. Blakeslee
*Attorney*—R. J. Guenther and R. B. Ardis

[57] ABSTRACT

A switching strategy, and apparatus for implementing the strategy, that reduces degradation of transmission quality resulting from the use of mixed cable and satellite channels in a time divided transmission system is disclosed. The type of channel preferred by a trunk requiring a connection is determined on the basis of the types of channels the trunk was assigned locally and remotely at the time of its last connection and the type of channel in the majority at the time of the determination.

8 Claims, 6 Drawing Figures

INVENTORS N. G. LONG
C. J. MAY, JR.

FIG. 3

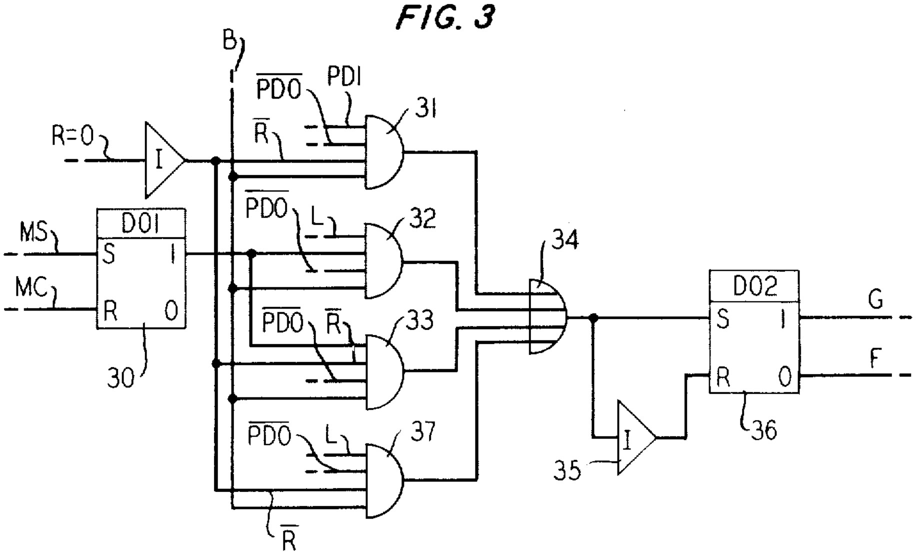

FIG. 4

$D01 = 1$
(MORE LONG DELAY CHANNELS AVAILABLE)

LOCAL = L (columns 1–2); PDI (rows 1–2); REMOTE = R (columns 2–3)

| | | | |
|---|---|---|---|
| D | D | S | D |
| S | S | S | S |
| S | S | S | S |
| D | D | S | D |

$\overline{D01} = 1$
(MORE SHORT DELAY CHANNELS AVAILABLE)

LOCAL (columns 1–2); PDO (rows 2–3); REMOTE (columns 2–3)

| | | | |
|---|---|---|---|
| D | S | S | D |
| S | S | S | S |
| S | S | S | S |
| D | S | S | S |

SET EQUATION FOR D02

$${}_1D02 = PDI \cdot \overline{PDO} \cdot \overline{R} + D01 \cdot L \cdot \overline{PDO} + \overline{R} \cdot L \cdot \overline{PDO} + D01 \cdot \overline{R} \cdot \overline{PDO} = D02S$$

RESET EQUATION FOR D02

$${}_0D02 = \overline{D02S}$$

SWITCHING STRATEGY FOR MIXED DELAY TRANSMISSION CHANNELS

FIELD OF THE INVENTION

This invention relates to transmission systems and more particularly to transmission systems utilizing channels that have different transmission time delays.

BACKGROUND OF THE INVENTION

The advent of satellite communications has opened new avenues for transmitting information effectively over long distances. In the past, a great deal of the transoceanic communication accomplished was carried out via submarine cables. This is still the case today for numerous reasons; one of the more important being that cable transmission channels offer an extremely reliable means for transmitting information. However, the use of satellite transmission channels is becoming more common in long range communication. Consequently, it is desirable for transmission systems to have the facility of transmitting information over both cable and satellite channels.

There are numerous types of transmission systems and the use of mixed channels in some types gives rise to no problems. However, the use of mixed channels in a system that transmits information on a time division basis does give rise to problems. An example of one such system is the Time Assignment Speech Interpolation (TASI) system.

As is well known, a TASI is a system that connects a trunk to a transmission channel only during the time the talker on the trunk is talking. When this talker pauses, the channel to which he was connected may then be connected to a different trunk on which a taker is talking. In other words, during the course of a conversation, a given talker may be connected to numerous different channels. Where the delay of all the channels is the same, the channel to which a talker is connected at various times is of no consequence. However, where delay may vary from channel to channel, the connection of a talker to various channels randomly during the course of a conversation can affect the quality of transmission.

More specifically, certain transoceanic transmissions via submarine cable may require *d* ms while the same transmissions via satellite require 5*d* ms. In other words, there is a substantial difference in the transmission time delays involved. One of the problems encountered in using a combination of such channels arises when the first of two successive speech bursts from a talker is transmitted over a long delay channel and the second burst is transmitted over a short delay channel. When this occurs, there is a contraction of the gap that originally separated the speech bursts. Conversely, if the first speech burst is transmitted on a short delay channel and the second on a long delay channel, there is an expansion of the gap separating the two bursts. The combined effect of such occurrences is a noticeable jittering of the speech signals heard by a listener.

Another similar problem arises from variation in round trip delay involved in a two-way conversation. This variation is manifested in the duration of the pauses between the time a taker stops talking and the time he hears his listener's response. If the talker's speech was transmitted over a long delay channel to the listener and the listener's response was transmitted back to the talker over a long delay channel, the pause may be unnaturally long and noticeable to the talker.

SUMMARY OF THE INVENTION

Applicants' invention minimizes the above-described problems by eliminating the random connection of an active trunk to any one of the available mixed delay channels. When an active trunk initially receives a connection, codes are stored indicating the type of channel assigned to the trunk at both the local and remote terminals. For instance, if a trunk receives a connection and it is assigned a short delay channel locally and a long delay channel remotely, the codes S and D, respectively, are stored locally for future reference. When this trunk becomes active again, after having lost its connection during an inactive period, the stored codes S and D are used to determine the type of channel to be assigned to the trunk locally at this time. When possible, the subsequent channel assigned has either a shorter delay or the same delay as the previous channel. Generally, the invention controls the channel assignment to a local trunk on the basis of past channel assignments for that trunk at the local and remote terminals and the availability of the various types of channels for assignment.

Assigning channels in this manner reduces the occurrence of subsequent channel assignments to a trunk that has delays different from the channels previously assigned to the trunk. Furthermore, it is also possible to minimize the occurrence of combinations of local and remote channel assignments that result in objectionably long round trip delay times by preferring selected combinations where more than one combination is possible.

It is an object of this invention to control the type of transmission channel assigned to a trunk in a transmission system.

It is another object of this invention to reduce changes in delay in a transmission system trunk's transmission path where the trunk's assigned channels vary during the operation of the system and the channels available for assignment present varying delays.

It is yet another object of the invention to minimize the occurrence of combinations of local and remote terminal channel assignments to a trunk in a time divided transmission system that result in a round trip delay exceeding a selected value.

It is a more specific object of the invention to control the type of channel to be assigned to a trunk requiring a connection in a time divided transmission system using various types of channels on the basis of the channels assigned to the trunk at the local and remote terminals during the preceding connection of the trunk.

The various objects, features and advantages of the invention will become more apparent upon considering the following discussion in conjunction with the drawings.

DESCRIPTION OF THE DRAWINGS

FIG. 3 shows a logic circuit for controlling channel assignments to trunks;

FIG. 4 is a Karnaugh map of the channel assignment strategy implemented by the circuitry of FIG. 3; FIGS. 2A and 2B are to be viewed as a single diagram.

DESCRIPTION OF THE INVENTION

Figure 1:
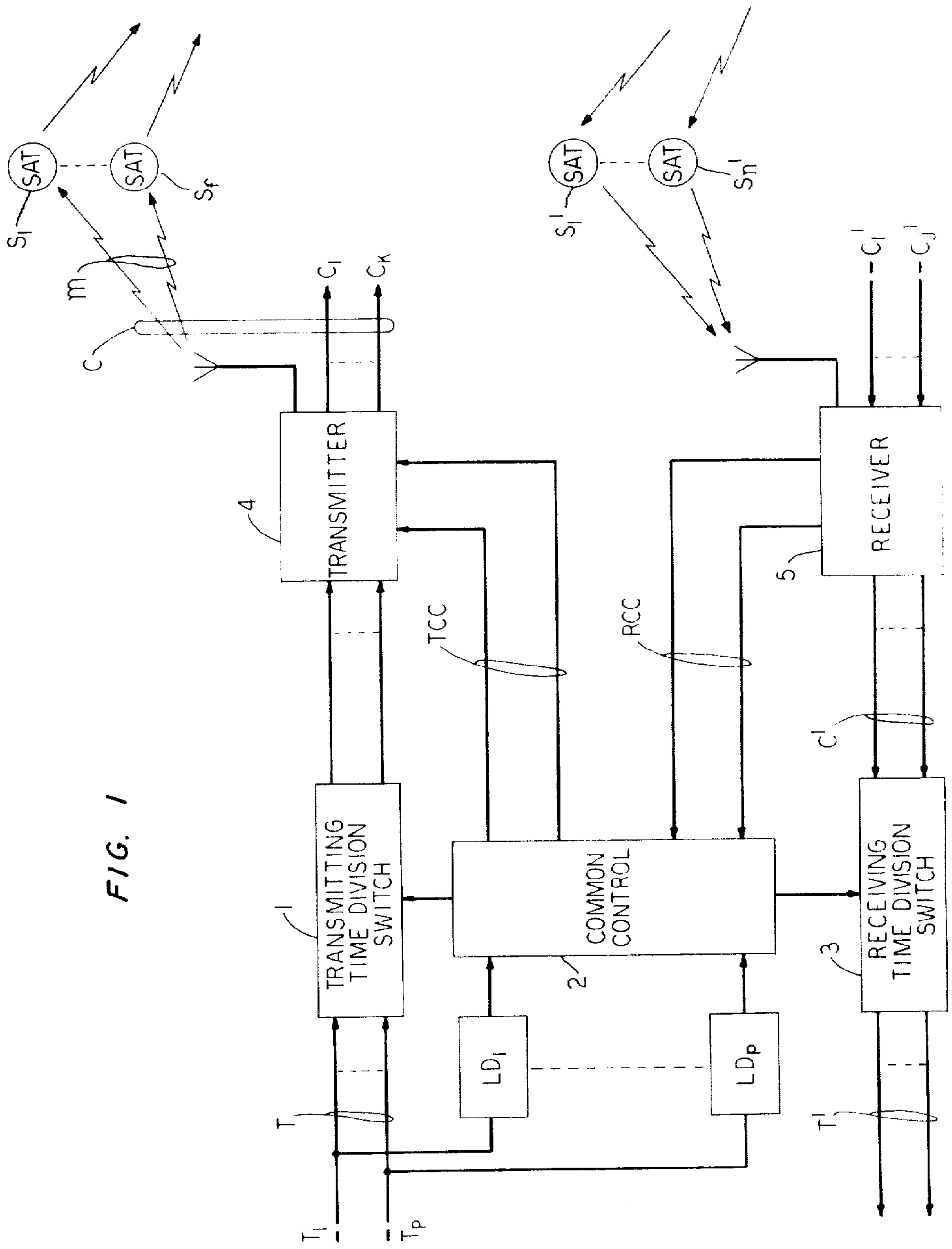
FIG. 1 shows a schematic block diagram of a TASI system that is useful in describing the operation of the invention.

For purposes of illustration, it will be assumed that the invention is a part of a TASI system using m satellite channels and c-m cable channels, as shown in FIG. 1.

In operation, varying numbers of the trunks T (FIG. 1) will be off-hook with the individuals using the trunks either listening or talking. The presence of talkers on trunks is detected by applying the speech signals on the trunks to common time-shared digital control circuitry 2 via per trunk digitizers $LD_i$. In essence, the digitized signal level on each trunk is sampled repetitively in a time slot associated with the trunk. The presence of a selected signal level on a trunk for a selected period of time results in speech detection circuitry in the common control 2 generating a signal in the trunk time slot that is applied to the switch 1. The application of this signal results in the switch connecting one of the channels C to the trunk. This channel carries the speech signal on the trunk to a remote system identical to that in FIG. 1. A detailed description of the speech detector circuitry in the common control 2 may be found in C. J. May, Jr., U.S. Pat. No. 3,530,999 issued July 21, 1970.

Once a trunk is connected to a channel it will remain connected to that channel as long as the individual using the trunk is talking. When the individual ceases talking, the signal level on the trunk decreases and this is sensed by the common control 2 (FIG. 1) as it periodically samples the output of the trunks digitizer $LD_i$. If the signal level remains at the lower level for a selected period the common control 2 generates a signal that results in the trunk being disconnected from the channel if other trunks are waiting for service. In other words, since the individual using the trunk is not talking he does not need the channel and he may be disconnected. This makes the channel available to other trunks which have speech signals present on them. In general, this mode of operation makes it possible to serve P trunks on C channels, where P $\eta$ C, by maintaining a trunk-channel connection only as long as the connection is required by the talker on the trunk.

It will be noted that during a normal conversation, the trunk being used by an individual at the local terminal will be repeatedly connected and disconnected to various ones of the transmission channels. The same will be true for the other participant utilizing the remote terminal facilities. In the system shown in FIG. 1, the channels consist of both satellite channels $S_i$ and cable channels $C_j$. To prevent a trunk from being randomly connected to either of these two types of channels, it is necessary to provide circuitry which controls the type of channel a trunk is connected to in the desired way.

Figures 2A, 5:
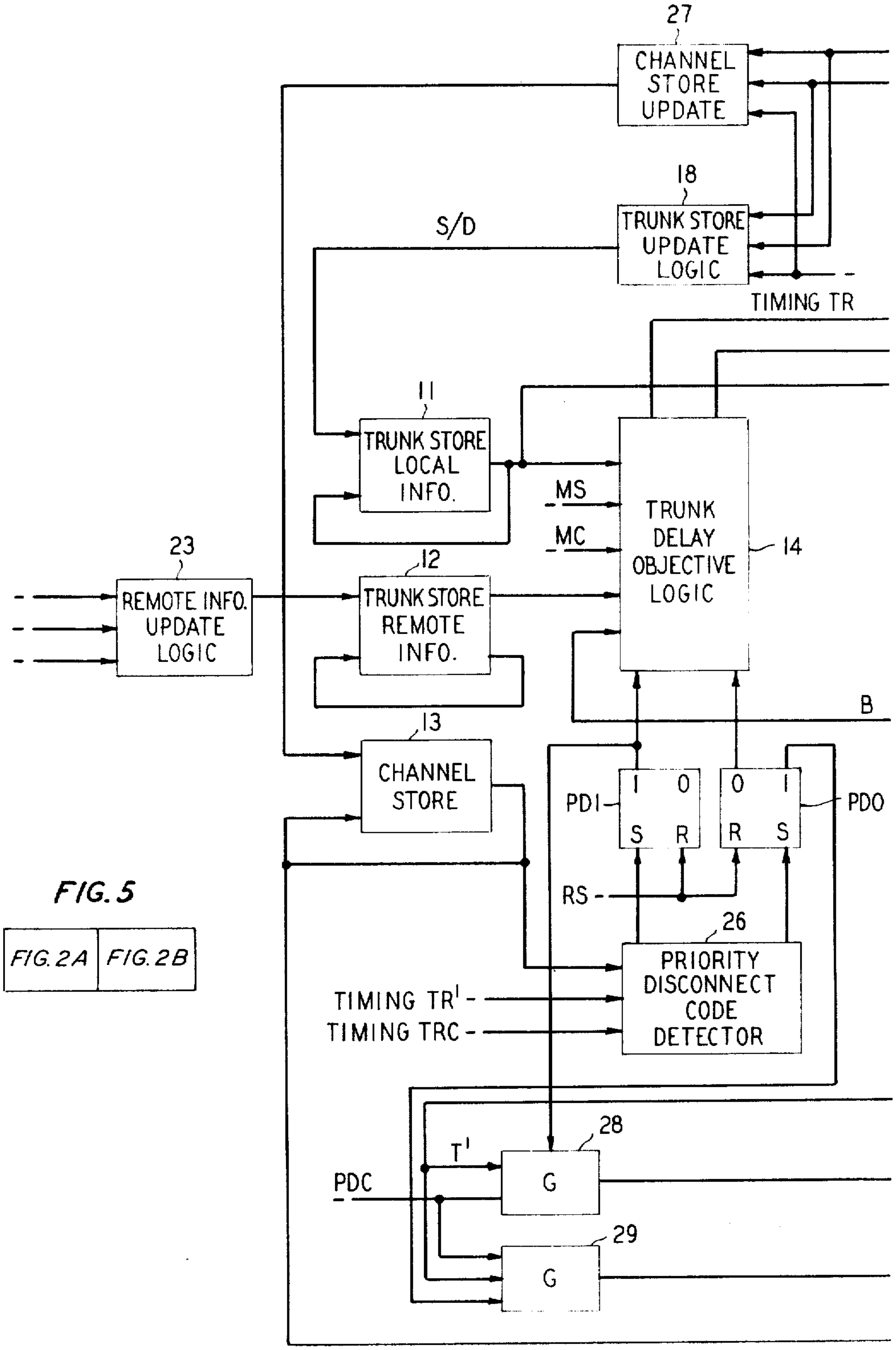
FIGS. 2A and 2B show a schematic block diagram of the invention connected for use in the system of FIG. 1.
FIG. 5 indicates how
Figure 2B:
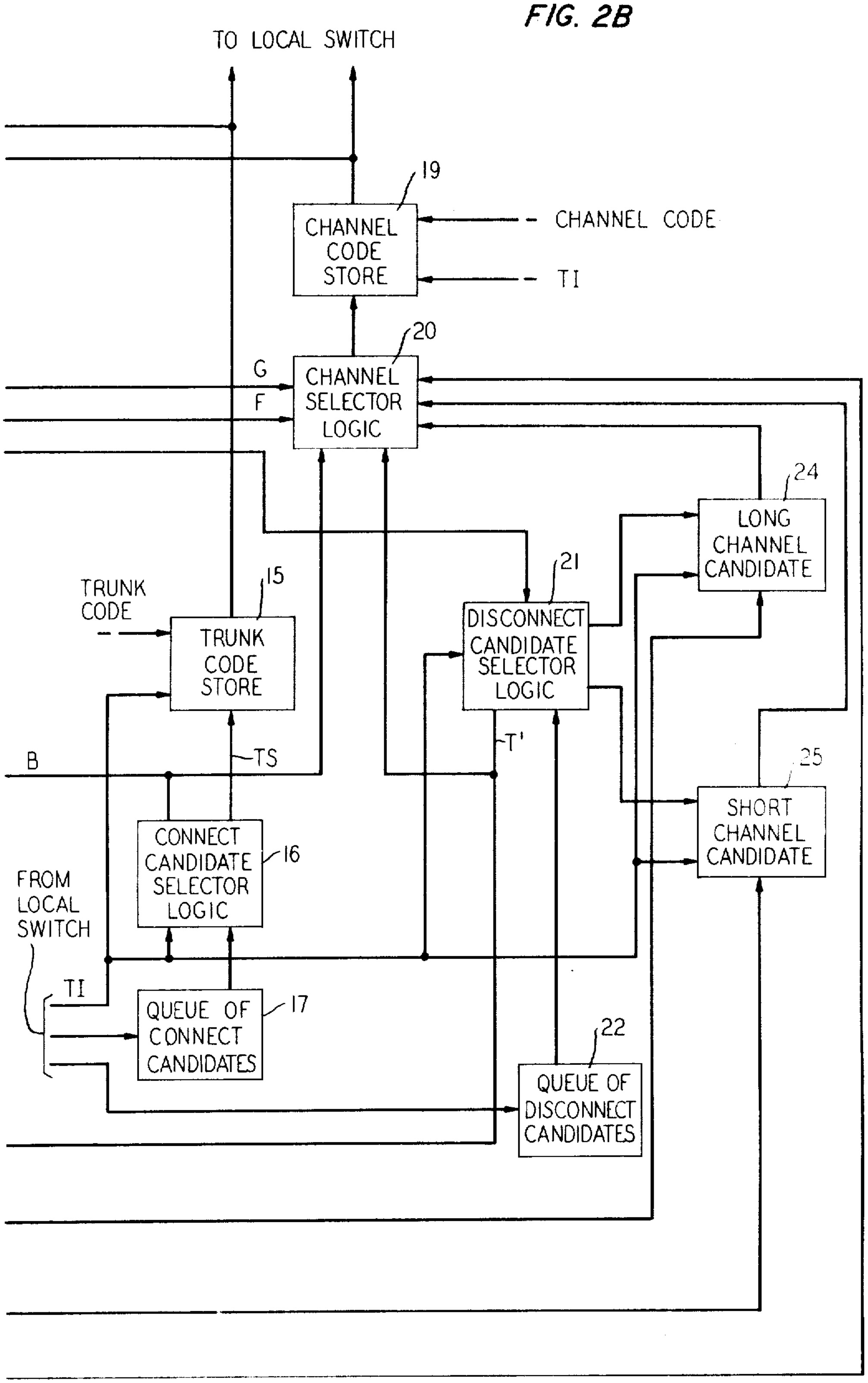

One method of accomplishing this control is to provide circuitry in the common control 2 (FIG. 1) which governs the channel assignment. A block diagram of the circuitry and its connection in the common control 2 (FIG. 1) is shown in FIGS. 2A and 2B. The trunk stores 11 and 12 (FIG. 2A) are time divided recirculating stores that operate in synchronism with the sampling time slots of the system. Codes, indicating the type of channel a trunk was last assigned locally and remotely, are stored in a location allocated to the trunk in each of the stores 11 and 12, respectively. Since these stores operate in synchronism with the system sampling time slots, the codes are available as store outputs every time their respective trunk is sampled.

The channel store 13 (FIG. 2A) is also a time divided store. Each channel is associated with a location in this store. When a particular channel is assigned to a particular trunk, a code identifying the trunk is stored in the channel store location associated with the assigned channel. In other words, it is possible to determine which trunk has a particular channel assigned to it by looking at the code in the channel store location associated with the channel.

In addition to trunk codes, the locations in the channel store 13 (FIG. 2A) may also contain priority disconnect codes. This code is written into a channel's associated storage location when the channel has been used for in service testing, rather than speech transmission, and is no longer needed for this purpose. Essentially, the priority disconnect code in a channel's storage location indicates that the channel is available for assignment. Since such a channel is not assigned to any trunk, it may be assigned without resulting in the disconnection of a temporarily inactive trunk that will require a connection when it becomes active again. Using the existence of priority disconnect codes in this manner reduces the number of connections and disconnections that occur in servicing active trunks under normal talker loads. In the event there are no channels associated with the priority code disconnect code available during a connection cycle, then a channel connected to an inactive trunk is selected from the set of such channels in the queue 22 (FIG. 2B).

Each connection cycle begins when a selected timing signal TRC Is applied to the code detector 26 (FIG. 2A). This timing signal occurs at a rate determined by the rate at which the switch 1 (FIG. 1) is capable of establishing new connections and has a duration equal to the time to scan all the locations in the store 13. In other words, if the switch is capable of establishing a new connection every $p$ milliseconds, then a timing signal will initiate the connection cycle every $p$ milliseconds.

When the timing signal TRC is applied to the detector 26 (FIG. 2A), the detector remains enabled for one complete scan of the channel store 13. The store may be a recirculating store that recirculates in synchronism with the system sampling time slots. Thus, the contents of the various store locations associated with channels are available in selected time slots. The availability of the contents of a store location in coincidence with a selected time slot identifies its associated channel. Furthermore, by partitioning the store 13, and assigning the locations associated with lower order time slots with the long delay channels and the short delay channels with the higher order time slots, it is possible to detect which type of channel a priority disconnect code is associated with if a system timing reference TR' is available.

At the time the code detector 26 (FIG. 2A) is enabled by the signal TRC, initiating the connection cycle, the contents of the location in the channel store 13 associated with channel 1 is available. This store location may be associated with either a satellite or a cable channel, depending on how the store 13 (FIG. 2A) is partitioned. Assuming that the delay satellite channels occupy the store locations available during the low order time slots, and a priority disconnect code is present in the first location available, the flip-flop PD1 (FIG. 2A) will be set by the detector 26. As succeeding time slots occur other locations associated with long delay channels of the store become available, but have no visible affect since PD1 is already set. If the priority disconnect code had been in the $g^{th}$ location associated with a long delay channel, instead of the first, the detector 26 would not have set flip-flop PD1 until the contents of the $g^{th}$ location was available. If there are no priority disconnect codes present in the store locations associated with the long delay channels, the flip-flop PD1 is not set.

As the scan of the store 13 (FIG. 2A) progresses, a point will be reached where the contents of the remaining unscanned locations are associated with short delay cable channels. This is the point at which the timing reference TR' is applied to the detector 26. The operation of the detector 26 is the same as described above except that the presence of a priority disconnect code in one of the locations while TR' is present results in the detector 26 setting flip-flop PDO instead of flip-flop PD1.

This first step in the connection cycle may be summed up as follows. The channel store 13 (FIG. 2A) is scanned and the presence of a priority disconnect code associated with either a satellite or cable channel is registered by setting the flip-flops PD1 or PD0, respectively.

Upon the completion of this step of the connection cycle the selector logic units 16 (FIG. 2B) and 21 are activated. The activation of the connect candidate selector logic 16 is accomplished by the application of the signal TI which is generated following the expiration of the signal TRC. The connect candidate selector 16 scans the queue 17 of trunks awaiting connections. It will be noted that TI is also applied to the disconnect candidate selector 21. It will be recalled that the queue 22, scanned by the disconnect candidate selector 21, contains the codes for trunks connected to channels that are not utilizing the channels and may be disconnected. Thus, at the same time a trunk is being selected from the connect queue 17, the choice of a channel to connect this trunk to is initiated by the disconnect candidate selector logic 21. The occurrence of the signal TI also clears the registers 19, 24 and 25 (FIG. 2B).

The disconnect candidate selector 21 (FIG. 2B) selects both a trunk connected to a long delay channel and a trunk connected to a short delay channel from the queue 22 if both types are present in the queue. The past connection information for a trunk in the queue 22 is available from the store 11 (FIG. 2A) at the same time the trunk's code is available in the queue. Thus, as each trunk code in the queue is applied to the logic 21, it is possible to determine whether the trunk is connected to a long or short delay channel. When a trunk code from the queue 22 is applied to the logic 21 and the past connection information for the trunk indicates it is connected to a long delay channel, the trunk code is stored in the register 24. Similarly, the trunk code of a trunk in the queue 22 is stored in the register 25 when the trunk's code and past connection information from the store 11 (FIG. 2A) are applied to the logic 21 and indicate the trunk is connected to a short delay channel.

After the selector logic 21 (FIG. 2B) has stored trunk addresses in the registers 24 and 25, or finished scanning the queue if candidates are not available, it generates a signal T' that is applied to the gates 28 and 29 (FIG. 2A). If either of the flip-flops PD0 or PD1 is set, indicating the existence of a channel associated with the priority disconnect code, the gate 29 or 28, respectively, is enabled and the priority disconnect code PDC is gated into the appropriate register 24 or 25 (FIG. 2B). If both flip-flops are set, then the PDC code is gated into both registers. Where the registers contain candidates taken from the queue 22, the PDC code replaces them when the gating operations occur. This illustrates how the invention prefers unassigned available channels over available channels currently assigned to trunks.

At this point, one or both of the registers 24 and 25 (FIG. 2B) contain data identifying the channel, or channels, that are potential candidates for assignment to a trunk. This data may either be in the form of trunk codes or priority disconnect codes. Whether both of the registers 24 and 25 contain data, or only one, or neither contain data depends on the system load. If there are no channels associated with PDC code and all of the channels are connected to trunks serving active talkers, the registers will not contain any data. This, however, will rarely occur if the system is operated within its limitations. Queues such as those disclosed in the copending application May Case on queuing, Ser. No. 781,145 filed Dec. 4, 1968, are examples of the types of queues that may be used in this system.

Simultaneously with the selection of the disconnect candidates, the trunk that is the connect candidate is selected from the queue 17 (FIG. 2B) and its delay objective is determined. The key components in this operation are the trunk delay objective logic 14 (FIG. 2A) and the selector logic 16 (FIG. 2B). The output of the stores 11 and 12 are connected as inputs to the delay objective logic 14 (FIG. 2A). This delay logic 14 also has three other inputs.

One of these inputs is a signal indicating the ratio of the types of available channels at the time a trunk requires the assignment of a channel. If there are more satellite channels available than cable channels, the signal MS (FIG. 2A) is present on one of the lines and conversely, the availability of more cable channels than satellite channels results in the presence of a different signal MC on a second line. When an equal number of the two types of channels are available, the occurrence of the two signals MS and MC alternate at a selected rate.

The remaining input to the delay objective logic 14 (FIG. 2A) is a signal B from the connect candidate selector logic 16 (FIG. 2B) indicating that a selected trunk requires a channel. At the time the enable signal B is applied to the delay objective logic 14 (FIG. 2A), the past connection history for the trunk selected by the candidate selector logic (FIG. 2B) is available in stores 11 and 12 (FIG. 2A). The enabled delay objective logic combines this past connection history with the rest of its inputs and generates a signal F or G indicating whether the trunk prefers a short or long delay channel, respectively.

The generation of the signal B and other signals occur when activated connect candidate logic 16 (FIG. 2B) and the disconnect candidate logic 21 select the trunk and channels from their respective queues. During the selection process, code generators are generating trunk nd channel codes in synchronism with the scanning of prospective candidates in the queues.

At the time a trunk is selected for connection, the connect candidate logic 16 (FIG. 2B) generates the signals B and TS. As was previously mentioned, the signal B enables the delay objective logic which has the past connection history of the selected trunk applied to its inputs from the stores 11 and 12 (FIGS. 2A). The signal TS gates a trunk code, generated by the trunk code generator operating in synchronism with the selection process, that identifies the selected trunk into the trunk code store 15 (FIG. 2B).

With the application of the signal B to the delay logic 14 (FIG. 2A), upon the selection of a trunk for connection, one of the two signals G or F is applied to the channel selector logic 20 (FIG. 2B). Generation of the signal G indicates that the selected trunk prefers a long delay channel which in this case is a satellite channel. On the other hand, generation of the signal F indicates that the selected trunk prefers a short delay cable channel. The application of one of these two signals to the channel selector logic 20 when the channel registers 24 and 25 contain data identifying a long and short delay channel results in the channel code for the channel having the desired delay being gated into the channel code store 19.

For instance, if the signal applied to the selector logic 20 (FIG. 2B) is G, indicating a preference for a long delay channel, the channel code for the selected long delay channel is gated into the channel code store 19. Similarly, the application of the short delay signal F results in the channel code for the selected short delay channel being gated into the store 19.

The function of the channel selector logic 20 (FIG. 2B) is to use the data in one of the registers 24 or 25 to select a channel for the connect candidate. Generally, this is accomplished by scanning the time divided channel store 13 (FIG. 2A) in synchronism with the system time slots and generating a signal when a trunk code is found in a channel store location that is identical with the one in the elected register 24 or 25 (FIG. 2B). When the signal B (FIG. 2B) is true and signal T' is false, the channel selector logic 20 is enabled. This combination of signals indicates that a connect candidate has been selected by the connect candidate logic 16 and data for determining the channel to be assigned is available from the registers 24 and 25 and delay objective logic 14.

Enabling of the channel selector logic 20 (FIG. 2B) is synchronized with the recirculation of the channel store 13 (FIG. 2A) and occurs in the time slot associated with channel 1. At this time the contents of the location associated with channel 1 is available from the channel store 13. The contents of this location, which is either a trunk code or a priority disconnect code PDC, is applied to the channel selector logic 20 (FIG. 2B).

The channel selector logic 20 (FIG. 2B) compares the output of the channel store 13 (FIG. 2A) with the contents of one of the registers 24 or 25 (FIG. 2B) if both registers are not cleared. If both registers are cleared, no channel is available for assignment to the trunk selected for connection and therefore, the trunk cannot be assigned a channel at this time. If both the registers 24 and 25 contain a trunk or PDC code, the code in one of the registers is selected by the channel selector logic 20 on the basis of the type of delay preference signal generated for the trunk. Where the connect candidate prefers a short delay channel, the presence of the signal F results in the channel selector logic 20 selecting the contents of the register 25. The contents of register 24 is selected where the converse is true. Where only one of the registers 24 or 25 contains a code, the contents of that register is selected without regard to the delay preference of the connect candidate.

Having selected the code from the register 24 or 25 (FIG. 2B), the channel selector logic 20 compares it with the contents of the channel store location available in time slot 1. If they are equal, the channel associated with time slot 1 is the channel selected for assignment to the connect candidate. When this equality occurs, the channel selector logic 20 generates a signal that gates the code for the selected channel into the channel code store 19. It will be recalled that the channel codes are also generated in synchronism with the system time slots and consequently the channel code for a channel is available at the time the contents of the location associated with the channel in the channel store 13 (FIG. 2A) are available. The foregoing has assumed a comparison during time slot 1. The basic operation of the circuitry is the same for any case. If the channel associated with time slot 1 is not the desired channel, then the comparison is made again during time slot 2, etc., until the desired channel is found.

At this point, the trunk code identifying the trunk to be connected and the channel code indicating the channel to which the trunk is to be connected are present in the stores 15 and 19 (FIG. 2B), respectively. This information is transmitted to the switch 1 (FIG. 1) which actually accomplishes the connection.

For the case where the disconnect queue does not contain both long and short delay channels, the preference of the trunk to be connected is ignored. In other words, if the trunk to be connected prefers a short delay channel and the only available channel is a long delay channel, the channel code for this long delay channel will be gated into the channel code store 19 by the channel selector logic 20 (FIG. 2B) notwithstanding the presence of the short delay preference signal F present as an input to the channel selector logic 20. In essence, this represents the philosophy that it is better to override the trunks channel preference and connect it to a long delay channel than to leave the trunk disconnected.

Once the channel code has been stored in the channel code store 19 (FIG. 2B), it is necessary to update connection information for the trunk being connected. This is done at both the local and the remote terminals. At the local terminal, the contents of the channel code store 19 (FIG. 2B) and the trunk code store 15 are applied to the trunk store update logic 18 (FIG. 2A) along with timing signals TR.

The trunk store 11 recirculates in synchronism with the occurrence of the timing signals TR. When the timing signals TR indicate the occurrence of the time slot for the trunk whose trunk code is stored in the trunk code store 15 (FIG. 2B), this trunk's assigned location is available in the store 11. At this time, the update logic 18 (FIG. 2A) is enabled and generates a signal S or D which indicates that the channel, whose code is in the channel store 19, is either a long or short delay channel. When this operation is complete, the connection information for the newly connected trunk is stored in hat trunk's assigned location in the store 11 (FIG. 2A) and correctly reflects the type of channel it is assigned locally.

If the channel code in the store 19 (FIG. 2B) represents a long delay channel, the update logic generates the signal D indicating the trunk is connected to a long delay channel. Where the channel code in the store 19 represents a short delay channel, the signal S is written in the trunk's assigned location in the store 11 indicating the trunk is connected to a short delay channel. This same kind of operation occurs at the remote terminal in updating the counterpart of the remote trunk store 12 (FIG. 2A) at that terminal. The local trunk store 11 is also updated in the same manner when the trunk and channel codes from the remote terminal are applied to the remote update logic 23 (FIG. 2A).

The channel store is updated in a manner analogous to that described above. The channel store update 27 (FIG. 2A), having the same inputs as the trunk store update 18, stores the trunk code contained in the trunk code store 15 (FIG. 2B) in the channel store 13 (FIG. 2A) location associated with the channel whose code is in the channel code store 19 (FIG. 2B). In essence, this records the fact that the indicated trunk is now connected to the indicated channel.

To summarize, the foregoing has shown how the circuitry in FIGS. 2A and 2B control the assignment of a transmission channel to a trunk. A trunk to be connected is selected from the queue of trunks waiting for connection. The preferred type of channel for this trunk is determined by the types of channels it was assigned locally and remotely at the time of its last connection. Simultaneously, the set of available channels is scanned and one of each type of channel is selected if possible. Then the trunk is assigned the type of channel indicated by its preference if this type is among the available channels. If the preferred type of channel isn't available, the trunk is assigned one of the available types.

As previously indicated, the strategy used in determining a trunk's channel preference is implemented with the delay objective logic 14 (FIG. 2A). One such circuit for implementing a strategy is shown in FIG. 3 and a Karnaugh map describing its operation is shown in FIG. 4.

The philosophy of this particular strategy is to minimize connections of local trunks to a long delay channel when these trunks are also assigned long delay channels at the remote terminal. During periods of heavy loading, where a majority of the system channels are long delay channels, these long-long connections will be established because no short delay channels are available. However, when the load decreases, the strategy eliminates the long-long connections as short delay channels become available. When the talker load is sufficiently light that there are enough short channels to service all talkers, the strategy results in the trunks carrying speech signals being connected to short delay channels both locally and remotely. Such a strategy reduces jittering speech and the occurrence of unnaturally long pauses that result from random connection of trunks to mixed delay channels. Additionally, the strategy reduces the number of times a trunk has to be connected during a conversation by assigning channels associated with a priority disconnect to newly active trunks instead of channels connected to temporarily inactive trunks when possible.

Referring to FIG. 3, the circuitry for implementing the strategy includes two flip-flops. The output of one flip-flop 30 indicates whether more cable channels or more satellite channels are available for connection at the time a trunk's delay objective is being determined. The signal MS, indicating the availability of more long delay satellite channels, is applied to the set side of the flip-flop 30. Thus, when the signal MS is applied to the flip-flop 30, a "1" appears on the output lead connected to its set side. The signal MC, indicating the availability of more short delay cable channels, is applied to the reset side of the flip-flop 30. The application of this signal resets the flip-flop 30 resulting in the signal on the set side output lead going to "0." In other words, the signal level on this output lead indicates the type channel available in the greatest volume.

FIG. 4 shows the Karnaugh map representing the strategy and the set and reset equations for the flip-flop 36 (FIG. 3) whose output indicates the delay objective for the trunk to be connected. The literal D indicates that the trunk was previously assigned a long delay channel. Similarly, S in the trunk's location in the local store 11 (FIG. 2A) indicates that the trunk was previously assigned a short delay channel. In the case of only two channel types a one-bit code can be used where D = 1 and S = 0.

It is clear from the reset equation (FIG. 4) that the DO2 flip-flop 36 (FIG. 3) will be reset unless one of the four logic terms in the set equation is true. When DO2 (FIG. 3) is reset the output signal F = 1 is present on its reset side output line. It will be recalled that this signal represents a short delay channel preference by the trunk about to be assigned a channel. This signal F is one of the output signals from the delay objective logic 14 (FIG. 2A) that is connected to the channel selector logic 20 (FIG. 2B).

When the flip-flop DO2 is set the output signal G = 1 is present on its set side output line. This signal, indicating a trunk preference for a long delay channel, is also applied to the channel selector logic 20 (FIG. 2B) like the flip-flops reset output signal F previously discussed. These two signals are used in the channel selection process as indicated in the discussion of FIGS. 2A and 2B.

Referring to the DO2 flip-flop set equation (FIG. 4) reveals that the flip-flop generally will be set when a trunk preference is for a long delay channel and such a channel is available in the majority, and when only long delay channels are available. Obviously, if a trunk prefers a long delay channel and this type of channel is available in sufficient quantity, the trunk should be connected to such a channel. Conversely, if only long delay channels are available, a trunk requiring a channel will be connected to the long delay channel even through it might prefer a short channel. This puts the previously mentioned philosophy that a long-long connection is preferable to no connection into practice. When the short delay channels are available in the majority and there are no channels associated with a priority disconnect code, a trunk's preference will be ignored and the trunk will be assigned a short delay channel.

The operation of the logic in FIG. 3 is readily demonstrated by the consideration of the following examples. Suppose that a trunk is selected from the queue of connect candidates 17 (FIG. 2B) that had previously been connected to a long delay channel locally and a short delay channel remotely. Under these conditions, the trunk will prefer a long delay channel again to minimize speech jitter. Further assume that the preceding scan of the channel store 13 (FIG. 2A) indicated that a priority disconnect code exists for a long delay channel by setting the flip-flop PD1 but no priority disconnect was found for a short delay channel.

When the trunk is selected for connection under these circumstances, the enable signal B is generated, PD1 = 1, PDO = 1, and the value R = 0 is available from the trunks allocated location in the remote information trunk store 12 (FIG. 2). It will be recognized that condition PD1 · $\overline{PDO}$ · $\bar{R}$ is the condition that enables gate 31 (FIG. 3). The enabling of gate 31 results in the enabling or OR gate 34 whose output sets the flip-flop DO2. The resulting flip-flop output G = 1 is applied to the channel selector logic 20 (FIG. 2) which assigns the long delay channel associated with the priority disconnect code to the trunk.

This example also illustrates how a preferred channel associated with a priority disconnect is assigned before preferred channels in the disconnect queue that have been assigned to trunks. Under the assumed conditions, the PDC code would be in the register 24 (FIG. 2B) and this would be the code used in assigning the channel. It will be recalled that this is done to minimize the number of times a trunk with a talker on it has its assigned channel changed. Since the channel associated with the priority disconnect code PDC was not connected to a trunk, assigning it to the trunk being connected does not require a disconnection from another trunk.

If the preceding example is altered by assuming that none of the channels have priority disconnect codes associated with them, a second situation arises in which gate 33 is enabled and the flip-flop DO2 (FIG. 3) is set to indicate a long delay channel preference. In this case the channels available for assignment are those long delay channels in the disconnect queue 22 (FIG. 2B) that are assigned to trunks that are currently inactive. A determination is made as to which type of channel is in the majority in the set of available channels. If a majority of the available channels are long delay channels the DO1 flip-flop 30 (FIG. 3) will be set by the application of the signal MS. With DO1 set and the existence of $\overline{TI}$ and $\overline{PDO}$, all the inputs to gate 33 are "1." Consequently, the gate is enabled and its output enables OR gate 34 which sets the DO2 flip-flop 36. Again, the G = 1 output of the DO2 flip-flop indicates that the trunk being connected prefers a long delay channel.

The reasoning behind this mode of operation is as follows. Since the trunk being serviced was assigned a short delay channel at the remote terminal when it was last connected and a majority of the available channels are long delay channels, it is desirable to give it a long delay channel at the local terminal. It would be less desirable to assign the trunk a short channel since this type is in the minority and might be needed to avoid long-long connections. As was previously indicated, the long-short combination is acceptable while long-long connections are undesirable. Consequently, the signal representing the long delay channel preference is generated.

The flip-flop DO2 (FIG. 3) is also set when the following conditions exist; the last channel assigned to the trunk locally was a long delay channel, no short delay channels are associated with a priority disconnect code, and the majority of available channels are of the long delay type. When this condition exists at the time the delay objective for a trunk is being determined, the DO1 flip-flop 30 (FIG. 3) is set and DO1·L·$\overline{PDO}$ = 1. These inputs enable gate 32 and its output enables gate 34 which results in the DO2 flip-flop 36 being set. In essence, the logic indicates a preference for the same type of channel that the trunk was connected to locally during its preceding connection when this type of channel is available in the majority. The enabling of this gate under these conditions could result in the establishment of long-long channel assignments. However, as will be seen later, these undesirable assignments are not stable.

The fourth set of conditions resulting in the DO2 flip-flop being set exists when he trunk to be connected was assigned a long delay channel locally and a short delay channel remotely at the time of its preceding connection, and no short delay channels associated with the priority disconnect code are available. Under these conditions L·$\overline{PDO}$·R = 1. These inputs enable gate 37 which results in the DO2 flip-flop being set. This operation again reflects the attempt to avoid the long-long connections that are objectionable and at the same time avoid short-short connects that require a temporarily inactive trunk to be disconnected.

It will be noted that none of the gates 31 through 33 and 37 will be enabled if the signal $\overline{PDO}$ = 0. In other words, when a short delay channel exists that is associated with a priority disconnect code, the preference of the trunk being assigned a channel will be reflected as a short delay preference. The DO2 flip-flop will not be set, and ultimately, the short delay channel will be assigned to the trunk even though assigning a long delay channel would not be objectionable. Since the priority disconnect code associated with the short delay channel indicates the channel is not assigned to a trunk, it is chosen before one of the disconnect candidates having a trunk assignment. The use of a short delay channel in place of a long delay channel is permissible since short-short connections do not give rise to objectionable degradation in transmission quality.

As was previously noted, the number of channels associated with a priority disconnect code become significant when the system is under a light load of talkers. Consequently, when the transmission system is being used by relatively few individuals, all the busy trunks tend to be assigned short delay channels at both terminals. This, in turn, insures that the assignment of long delay channels to trunks at both terminals which arises during peak loads is altered when the system load decreases.

Alternating the input signals to the DO1 flip-flop 30 when the different channel types are available in equal numbers inhibits the gates 32 and 33 periodically. This, of course, results in the DO2 flip-flop being set fewer times during the channel assignment for a given number of trunks than would be the case where a majority of long delay channels keep the DO1 flip-flop continually set. Alternating the inputs to the DO1 flip-flop alternates the trunk preference signal generated by the DO2 flip-flop under conditions that would normally set the flip-flop via gates 32 and 33. This results in the alternate assignment of channels from the different types of channels available in equal numbers. In essence, during periods of average loading, this operation minimizes the chance that all the short delay channels will be used by assigning some trunks short delay channels at both terminals and leaving only long channels for any additional trunks requiring channel assignment.

The foregoing has described a strategy, and apparatus for implementing the strategy, that controls channel assignment in a transmission system using more than one type of channel. The strategy described in detail is only illustrative of the numerous adaptations possible for use in the numerous types of existing transmission systems. For example, the use of priority disconnect codes may not be desirable, or possible, in some applications. On the other hand, in some applications it may be desirable to use the disclosed logical variables plus others to achieve the desired operation. Obviously, the detailed implementation will vary as with the types, and number of different types, of channels involved and with the particular transmission system being considered.

What is claimed is:

1. In a time division multiplex transmission system serving a plurality of trunks on a plurality of different channel types, the combination comprising:

means for generating signals indicating the type of channel assigned to a trunk at the local and remote terminals of the system when the trunk receives a connection;

means for storing the signals in the local terminal; and selector means responsive to the stored signals for determining the type of channel the trunk is to be assigned at the local terminal when the trunk is selected for reconnection after having lost its previous connection.

2. The combination of claim 1 further comprising;

channel ratio signals indicating selected relationships between the quantities of various types of channel available for assignment;

where said selector means is further responsive to selected combinations of the channel ratio signals and said stored signals.

3. The combination of claim 2 wherein said channel ratio signals indicate the type of channel that is available for assignment in the greatest quantity.

4. In a time divided transmission system utilizing various different types of transmission channels, the combination comprising;

signals representing the type of channel a trunk was last assigned at the local terminal serving said trunk;

signals representing the type of channel a trunk was last assigned at the remote terminal;

signals indicating which type of channel is available for assignment in the greatest quantity; and means for generating an enable signal when said trunk requires another channel assignment at the local terminal; and means responsive to said enable signal and selected combinations of said signals for generating a channel type preference signal indicating the type of channel preferred by said trunk.

5. In a time divided transmission system utilizing more than one type of transmission channel, the combination comprising;

a first trunk store for storing signals representing the type of channel last assigned to a trunk at the local terminal serving the trunk;

a second trunk store for storing signals representing the type of channel last assigned to said trunk at the remote terminal;

channel ratio signals indicating selected relationships between the quantities of various types of channels available for assignment;

means for generating an enable signal indicating that said trunk requires a channel assignment when said trunk is selected for reconnection after having lost its last connection;

delay objective logic responsive to said enable signal and selected combinations of the channel ratio signals and signals in first and second trunk stores for generating a channel type preference signal, and Channel selector logic responsive to the preference signal for selecting a channel code identifying the channel to be assigned to said trunk.

6. In a time divided transmission system utilizing both satellite and cable transmission channels, the combination comprising;

a first store for storing signals representing the type of channel last assigned to a trunk at the local terminal serving the trunk;

a second store for storing signals representing the type of channel last assigned to said trunk at the remote terminal;

a connect queue containing entries identifying trunks awaiting connection at said local terminal;

a disconnect queue containing entries identifying trunks at said local terminal awaiting disconnection from channels;

means for reassigning the local channel assigned to said trunk when the trunk no longer requires a connection;

means for placing an entry identifying said trunk in said connect queue when said trunk later requires a connection;

means for selecting said trunk from the entries of said connect queue;

channel candidate selector logic for selecting a candidate channel of each type from the entries in said disconnect queue;

means for storing codes identifying the selected candidate channels;

means responsive to the selection of said trunk and the signals in said first and second stores representing the types of channels last assigned to said trunk for generating a channel type preference signal; and means responsive to said channel type preference signal for selecting one of said candidate channels identified by the stored codes as the channel to be assigned to said trunk.

7. The combination of claim 6 further comprising;

means for detecting the availability of channels at the local terminal that are not assigned to a trunk; and means for replacing the code identifying either of candidate channels selected by said candidate selector logic with a code identifying the same type of unassigned channel if such an unassigned channel is detected, where such replacement occurs prior to the selection of the candidate channel to be assigned to said trunk.

8. In a time divided transmission system utilizing both satellite and cable transmission channels, the combination comprising;

a bistable device;

an availability signal source for indicating that all channels of a selected type are assigned to trunks;

a signal source for indicating that one type of channel is available for assignment in the greatest number connected to the set input of said bistable device;

a signal source for indicating when the other type of channel is available for assignment in the greatest number connected to the reset input of said bistable device;

means for indicating the type of channel a trunk was last assigned at the local terminal of said transmission system that serves said trunk;

means for indicating the type of channel said trunk was last assigned at the remote terminal of said transmission system;

a first plurality of AND gates each of which has inputs connected to a selected output of said bistable device and one of the means for indicating the type of channel last assigned to said trunk;

a second plurality of AND gates each of which has inputs connected to said signal availability source and one of the means for indicating the type of channel last assigned to said trunk; and an OR gate with its inputs connected to the output of each of said AND gates for generating a channel type preference signal.

* * * * *

UNITED STATES PATENT OFFICE
CERTIFICATE OF CORRECTION

Patent No. 3,681,533 Dated August 1, 1972

Inventor(s) Norwood G. Long and Carl J. May, Jr.

It is certified that error appears in the above-identified patent and that said Letters Patent are hereby corrected as shown below:

Column 1, line 36, "taker" should read --talker--.

Column 3, line 45, "PηC" should read --P>C--.

Column 4, line 41, after "time" insert --required--.

Column 5, line 3, after "the" insert --long--.

Column 6, line 33, delete "the copending application May case on queuing, Ser." and insert --U. S. patent No. 3,573,745 issued April 6, 1971,--;
line 34, delete "No. 781,145 filed December 4, 1968,";
line 64, after "logic" insert --16--.

Column 7, line 8, "nd" should read --and--;
line 48, "elected" should read --selected--.

Column 9, line 12, "hat" should read --that--.

Column 11, line 30, "or" should read --of--;

Column 12, line 33, "he" should read --the--.

Column 14, line 34, "," should read --;--;
line 36, "Channel" should read --channel--.

Column 15, line 13, after "of" insert --the--.

Signed and sealed this 8th day of May 1973.

(SEAL)
Attest:

EDWARD M.FLETCHER,JR.
Attesting Officer

ROBERT GOTTSCHALK
Commissioner of Patents